United States Patent [19]
King, Jr.

[11] Patent Number: 5,608,849
[45] Date of Patent: Mar. 4, 1997

[54] METHOD OF VISUAL GUIDANCE FOR POSITIONING IMAGES OR DATA IN THREE-DIMENSIONAL SPACE

[76] Inventor: Donald King, Jr., 931 Cloud Ave., Menlo Park, Calif. 94025

[21] Appl. No.: 187,621

[22] Filed: Jan. 26, 1994

Related U.S. Application Data

[63] Continuation-in-part of Ser. No. 750,627, Aug. 27, 1991.
[51] Int. Cl.$^6$ .............................. G06T 7/20; G09B 23/28
[52] U.S. Cl. ......................... 395/119; 382/128; 382/131; 382/132; 128/660.07; 128/660.08
[58] Field of Search ........................... 395/119; 382/128, 382/131, 132; 128/660.07, 660.08

[56] References Cited

U.S. PATENT DOCUMENTS

| Re. 30,397 | 9/1980 | King | 128/600.07 |
| 4,100,916 | 7/1978 | King | 128/660.07 |
| 5,353,354 | 10/1994 | Keller et al. | 382/128 |

OTHER PUBLICATIONS

R. A. Robb et al, Interactive Display and Analysis of 3–D Medical Images, IEEE Transactions on Medical Imaging, vol. 8, No. 3, pp. 217–226, Sep. 1989.

R. H. Selzer et al, Computer–Generated 3D Ultrasound Images of the Carotid Artery, Computers in Cardiology, pp. 21–26, 1989.

W. E. Moritz, D. H. McCabe, A. S. Pearlman, D. K. Medema, "Computer–Generated Three–Dimensional Ventricular Imaging From a Series of Two–Dimensional Ultrasonic Scans", American Review of Diagnostics, 3:73–77, Jul.–Aug. 1983.

J. F. Brinkley, W. D. McCallum, S. K. Muramatsu, D. Yee Liu, "Fetal Weight Estimation From Utrasonic Three–Dimensional Head and Trunk Reconstructions: Evaluation in Vitro", Am. J. Obstet. Gynecol. 144:715–721, Nov. 15, 1982.

J. S. Raichlen, S. S. Trivedi, G. T. Herman, M. G. St. John Sutton, N. Reichek, "Dynamic Three–Dimensional Reconstruction of the Left Ventrical From Two–Dimensional Echocardiograms", JACC, vol. 8, No. 2, pp. 364–370, Aug. 1986.

R. A. Levine, M. D. Handschumacher, A. J. Sanfilippo, A. A. Hagege, P. Harrigan, J. E. Marshall, A. E. Weyman, "Three–Dimensional Echocardiographic Reconstruction of the Mitral Valve, With Implications for the Diagnosis of Mitral Valve Prolapse", Circulation, vol. 80, No. 3, pp. 589–598, Sep. 1989.

R. W. Martin, G. Bashein, "Measurement of Stroke Volume with Three–Dimensional Transesophageal Ultrasonic Scanning: Comparison with Thermodilution Measurement", Anesthesiology, 70:470–476 1989.

*Primary Examiner*—Mark K. Zimmerman
*Assistant Examiner*—Stephen Hong
*Attorney, Agent, or Firm*—Buchanan Ingersoll, P.C.; Robert J. Pugh

[57] ABSTRACT

A method for displaying interactively a three dimensional spatial relationship between one or more real-time ultrasound image of tissue and one or more reference images of that tissue. A reference image is produced by obtaining reference image data through a probe and obtaining positional data corresponding to the reference image data by a spatial locater. Real-time images are produced by obtaining real-time image data through an ultrasound probe and obtaining positional data corresponding to the real-time image data through a spatial locater. The reference image data, the reference positional data, the real-time image data and the real-time image positional data are transmitted to a processing and storage means where independent data representing spatial relationships between the real-time image data and the reference image data are generated. Either or both of the real-time images and the reference image is displayed in which the three-dimensional spatial relationship between the reference image and the real-time images is instantaneously displayed. The method is preferably iterative, such that one or more of the real time images may be stored and utilized as a reference image. Additionally, a non-imaging probe having a spatial locater may be utilized with either or both of the real-time and reference images.

10 Claims, 5 Drawing Sheets

METHOD OF VISUAL GUIDANCE FOR POSITIONING IMAGES OR DATA IN THREE-DIMENSIONAL SPACE

RELATED APPLICATION

This application is a continuation-in-part of Ser. No. 07/750,627, filed Aug. 27, 1991.

BACKGROUND OF THE INVENTION

1. Field of the Invention

The present invention relates to a method for providing an operator with visual information for guiding the position and orientation of images or a probe in three-dimensional space.

2. Description of the Prior Art

The inventor has discovered a need for a method, using the apparatus described in U.S. Pat. No. Re. 30397 for allowing an operator to accurately position and display the position and orientation of an image or non-imaging probe in three-dimensional space, with particular regard to the orthogonal, "non-visualized" dimension not seen in the conventional two-dimensional image.

This method is useful in medical diagnosis. For example, it provides a reliable and effective means for making more accurate and reproducible measurements of the heart by use of ultrasound imaging.

Ultrasound images are two-dimensional, cross-sectional, tomographic images, A general characteristic of conventional two-dimensional, real-time ultrasound scanners is that they have no means for spatial registration of the position and orientation of the scanning transducer and its image with respect to an independent spatial coordinate system. Conventional two-dimensional, real-time ultrasound scanners can be moved, angulated and rotated into an almost infinite variety of positions and orientations. Because the scanning transducer is hand-held by the operator, the position and orientation of images is guided by the proprioceptive sense of the operator as he/she interprets image content in terms of a prior knowledge of anatomy. The only visual indication to the operator of spatial dimensions that he/she is able to use is that given in the two-dimensional image itself. He/she has no visible knowledge of the position and orientation of the image with respect to internal anatomic landmarks in the third dimension not visualized in the image. This lack of visible orienting information is a major problem to conventional ultrasound imaging because the scanning transducer must be deliberately positioned and its image acquired by the operator.

When the variety of potential positions and orientations of the image is coupled with the variation found in normal anatomy a serious problem exists of accurately locating and documenting the position of an image. In current practice there is significant uncertainty concerning the exact position and orientation of the image. This problem has represented an important difficulty in the conventional use of diagnostic ultrasound imaging requiring a high degree of operator skill. The uncertainty of position and orientation and its consequent variability, as well as the operator skill required to deal with this problem, has therefore limited the application and usefulness of ultrasound imaging.

This problem persists with use of the three-dimensional ultrasonic imaging apparatus as described in U.S. Pat. No. Re. 30397. Although that apparatus registers image position and orientation in a three-dimensional spatial coordinate system there has been no means to convey this information to the operator of the system so that he/she may use it to guide operation of the system.

An important need of medical diagnosis using ultrasonic imaging is to make accurate and reproducible measurements of various organs. For example, when imaging the heart it is of great value to measure the size of chambers to determine the efficiency of cardiac pump function. To make such measurements accurate and reproducible, two requirements must be met. First, images must be obtained in a specified and reproducible position and orientation, and second, measurements within those images must be performed in a standardized manner. Because of the lack of registration of the movement of the ultrasound transducer and the lack of a means for displaying its position and orientation in the non-visualized dimension the former requirement is subject to systematic as well as random error. When these errors occur, erroneous measurements will result regardless of the performance of measurements within the image in a standardized manner. To be able to eliminate these errors, first, the movement of the transducer must be registered in three-dimensional space and second, a means to visually display image position and orientation in the orthogonal, "non-visualized" dimension must be found. The visual display of the relationship of the real-time image to anatomic landmarks in its non-visualized dimension will then feed back the information necessary for the operator to accurately position the real-time, two-dimensional ultrasound image.

The apparatus described in U.S. Pat. No. Re. 30397 provides a means for the spatial registration of the ultrasound transducer and image. Its use without additional refinement however does not provide the visual display necessary for accurate positioning of images. It is the purpose of this disclosure to describe a method to be followed that provides a means for accurately positioning an image with respect to translation, angulation and rotation in the dimensions not visualized in the image itself.

Use of the apparatus described in U.S. Pat. No. Re. 30397 without a visual display for image position has been made by Moritz et al. (Moritz et al. Computer-Generated Three-Dimensional Ventricular Imaging from a Series of Two-Dimensional Ultrasonic Scans. AM Rev. Diagnostics 1983; 3:73–77) for the purpose of imaging the ventricles of the heart and computing their volumes. They were presented with the problem of accurate positioning of image planes. They addressed it by recording a large number of intersecting images in a variety of positions and orientations hoping to adequately define all boundaries without the use of a visual display to guide image positioning. Brinkley et al. (Brinkley JF et al. Fetal Weight Estimation from Lengths and Volumes Found by Three-Dimensional Ultrasonic Measurements. J Ultrasound Med 1984; 3:162) used a similar system and algorithm for defining boundaries for the purpose of measuring fetal volume. They noted the deficiency of this approach, particularly for defining end-planes. Levine et al. (Levine RA et al. Three-Dimensional Echocardiographic Reconstruction of the Mitral Valve, with Implications for the Diagnosis of Mitral Valve Prolapse. Circulation 1989; 80:589) also used the system described in U.S. Pat. No. Re 30397 for the purpose of reconstructing the three-dimensional anatomic relationships of the mitral valve. They did not address the problem of a visual means for guiding image plane positioning. Other three-dimensional scanners utilizing mechanical apparatus for position registration (Raichlen JS et al. Dynamic Three-Dimensional Reconstructions of the Left Ventrical from Two-Dimensional Echocardiograms. J Am Coll Cardiol 1986; 8:364) have been constructed but none has addressed the problem of image positioning in the non-visualized dimension. Three-dimensional reconstruction of the heart by means of transesophageal echocardiography (Martin RW et al. Measurement of Stroke Volume with Three-Dimensional Transesophageal Ultrasonic Scanning: Comparison with Thermodilution Measurement Anesthesiology 1989; 70:470) has also been attempted without the use of an image positioning guidance method other than that used with conventional system. In summary, none of the three-dimensional ultrasound imaging systems developed to date, including some based on the apparatus described in U.S. Pat. No. Re 30397, have provided a means to prospectively and interactively guide image positioning by the operator or to document visually image position and orientation in the examination record.

SUMMARY OF THE INVENTION

I provide a method for displaying interactively a three dimensional spatial relationship between one or more real-time ultrasound image of tissue and one or more reference images of that tissue. A reference image is produced by obtaining reference image data through a probe means and obtaining positional data corresponding to the reference image data by a spatial locater means. The probe means for obtaining the reference image data may be any preferred imaging means such as an ultrasound probe, an X-ray computed tomography scanner, a nuclear magnetic resonance scanner or a radiograph. The spatial locater means may be any preferred position sensing means such as an acoustic position sensor, an optical position sensor, a magnetic position sensor, an electro-mechanical position sensing arm, or an inertial position sensor.

Real-time images are likewise produced by obtaining real-time image data through an imaging probe and obtaining positional data corresponding to the real-time image data through a spatial locater means. The real-time images are preferably obtained through an ultrasound probe. The spatial locater means used with the real-time image gathering may be the same spatial locater means as is used with the reference image, or may be a separate means.

The reference image data, the reference positional data, the real-time image data and the real-time image positional data are transmitted to a processing and storage means where independent data representing spatial relationships between the real-time image data and the reference image data is generated. Either or both of the real-time images and the reference image is displayed in which the three-dimensional spatial relationship between the reference image and the real-time images is instantaneously displayed. The data representing the spatial relationship between the reference image and the real-time images are preferably generated and displayed as a line of intersection of the reference image and the real-time images. The spatial relationship may be further displayed in a projection orthogonal to the line of intersection of the reference image and the real-time images.

The method is preferably iterative, such that one or more of the real time images may be stored and utilized as a reference image. Additionally, a non-imaging probe having a spatial locater may be utilized with the real-time and reference images.

Other details, objects and advantages of the invention will become apparent as the following description of certain present preferred embodiments thereof proceeds.

DESCRIPTION OF THE PREFERRED EMBODIMENT

Figure 1:
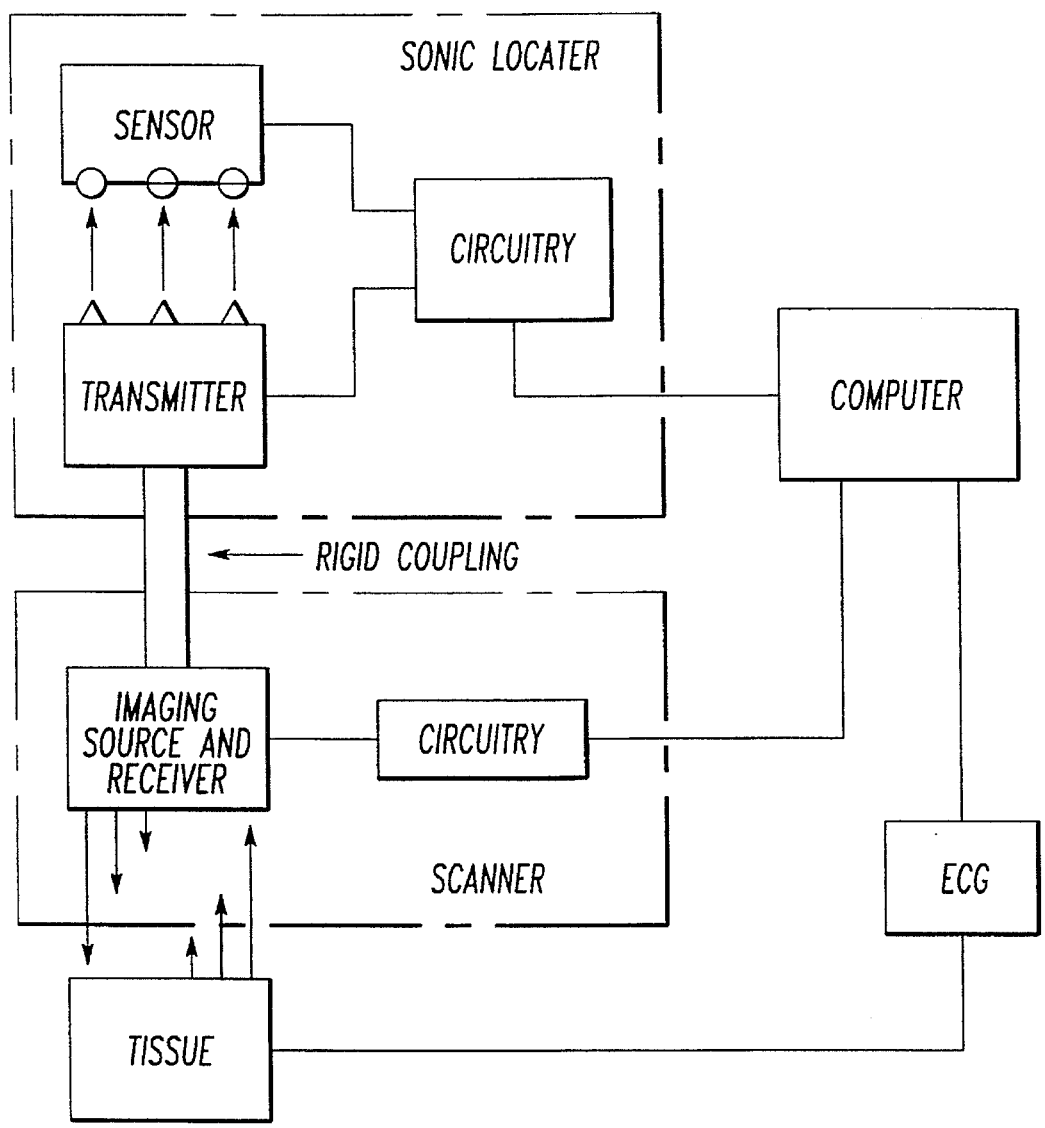
FIG. 1 is a schematic block diagram showing the preferred apparatus with which the method may be used.

This invention is a method for providing an operator with visual information for guiding the position and orientation of images or a probe in three-dimensional space. The apparatus described in U.S. Pat. No. Re 30397, shown in prior art FIG. 1, will now be briefly discussed as that device is pertinent to the method of the present invention. The apparatus of U.S. Pat. No. Re 30397 is comprised of three primary components: an imaging means, a position sensor (spatial locater) and a computer processor. The imaging means sends acoustical wave signals into tissue and receives signals therefrom so as to create electronic output corresponding to the physical characteristics of the received waves. Such a device may be a medical diagnostic imaging ultrasonic scanner. The spatial locater of U.S. Pat. No. Re 30397 is a non-mechanical, non-contacting (such as an acoustical device) position sensing device having transmitters and receivers which are used in conjunction with the imaging or non-imaging probe to locate the imaging means in a three-dimensional spatial coordinate system defined by the position sensing device. The positioning sensing device creates electronic output which, along with the electronic output of the imaging means, are transmitted to the digital computer. The computer processes the received information and displays it in a useful way. In the description of the method of the preferred embodiment, the apparatus of U.S. Pat. No. Re 30397 is incorporated herein by reference.

Several terms will be used throughout the description, and therefore, definitions of important terms are provided:

Real-time image—the output display of a conventional two-dimensional, cross-sectional ultrasound imaging system. The image is typically created twenty to thirty times per second and rapidly depicts changing anatomy due to motion of either the anatomy or the scanner.

Reference image—a single real-time image (or other image such as a CT scan) saved in computer memory along with its three-dimensional spatial coordinates.

Line of intersection—the line in space common to two intersecting image planes.

Ultrasound beam—a single (one-dimensional) ultrasound beam (or "line") as distinguished from multiple beams created rapidly in planar spatial orientation to create a two-dimensional, cross-sectional image.

Non-imaging probe—an instrument of any type such as a straight probe, a biopsy needle or other instrument used in conjunction with the apparatus to achieve a desirable diagnostic or therapeutic result. Such a probe may be mounted in or used in connection with a spatial locating device in a manner similar to the ultrasound probe described in U.S. Pat. No. Re. 30397.

Non-visualized dimension—in reference to the conventional planar, two-dimensional, cross-sectional, real-time image (or any similar planar image) the visualized dimensions are the X and Y dimensions within the image, while the non-visualized (Z) dimension is that orthogonal to the image and not seen in the image. Specifically, it refers to dimensions of the planar image, and not to the dimensions of the three-dimensional coordinate system into which these images are placed by the apparatus described in U.S. Pat. No. Re. 30397.

Two-dimensional display—A display which relies upon the use of two-dimensional images that do not incorporate methods for presenting three-dimensional information, but taken together by means of mental integration may convey three-dimensional information.

Three-dimensional display—One which incorporates the concepts, techniques and methods of computergraphics for conveying in an image the perception of three-dimensions. Such techniques and methods include but are not limited to the use of perspective, modeling, shadowing, motion or rotation, wire-frame models, surface rendering, stereoscopy and so forth.

Figure 2:
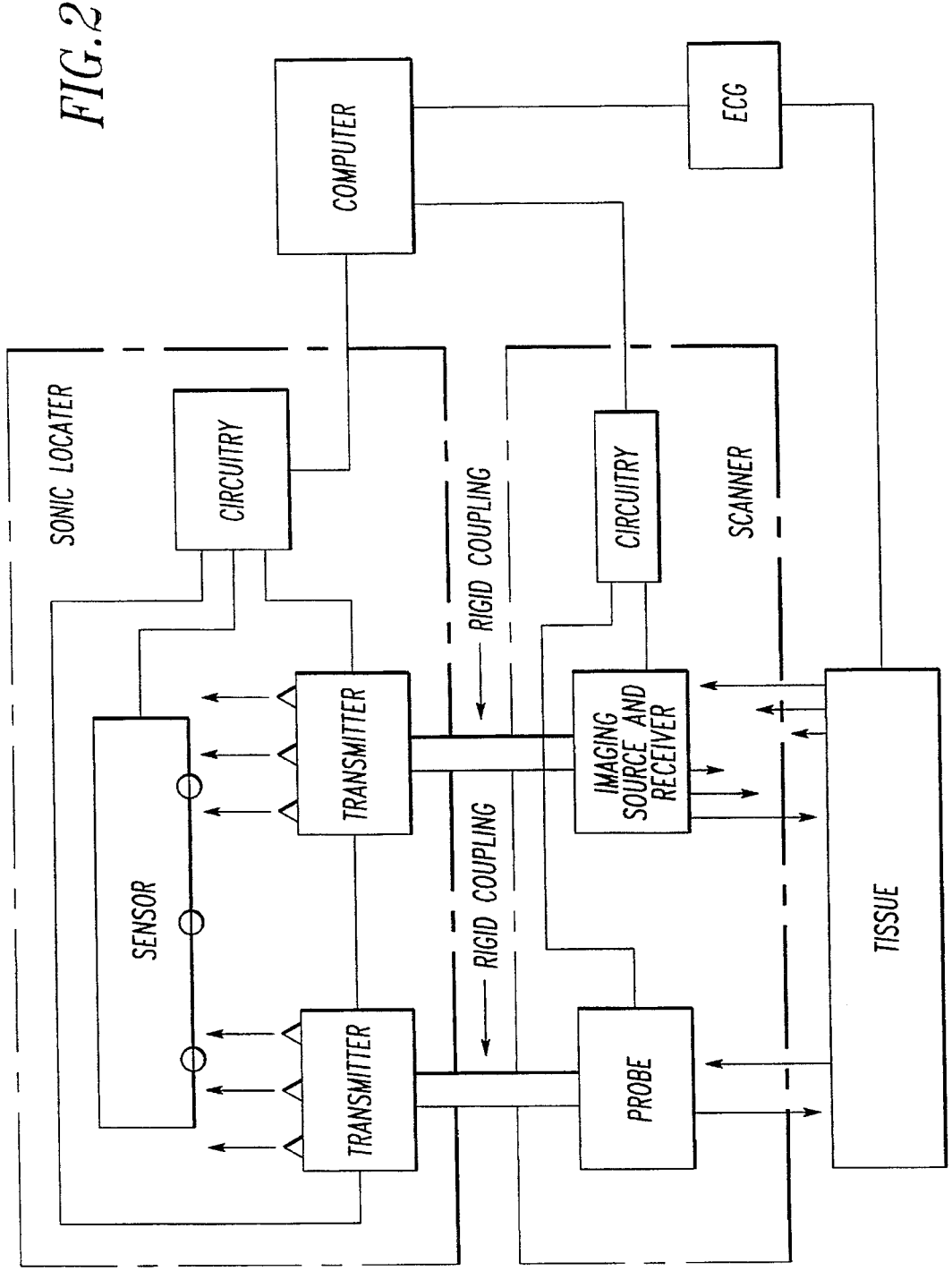
FIG. 2 is a schematic block diagram showing a variation of the preferred apparatus which includes a probe.

The method can be applied with variations of the apparatus described in U.S. Pat. No. Re. 30397 that use one or more of several imaging means (probes) either simultaneously or sequentially, shown in FIG. 2, in conjunction with the spatial locater as described in U.S. Pat. No. Re. 30397 or one of several alternate position sensors and the computer processor. The various imaging means include but are not limited to the ultrasonic two-dimensional real-time scanner described in U.S. Pat. No. Re. 30397, an ultrasonic probe such as a continuous wave Doppler probe, a radiograph, an imaging system such as an X-ray computed tomography scanner, a nuclear magnetic resonance scanner or a conventional X-ray imaging system similar to that used in angiography.

In conjunction with one or more of these imaging systems either simultaneously or sequentially a non-imaging probe coupled to the position sensor in a manner similar to the imaging system may be used to transmit to the computer spatial information concerning the tissue being examined, for example, by indicating certain anatomic points with the tip of the non-imaging probe. The position sensor (spatial locater) may be the spatial locater device described in U.S. Pat. No. Re. 30397 or an alternate position indicating means. Alternate position indicating means that may be used in place of the device described in U.S. Pat. No. Re. 30397 include, for example, an electro-mechanical, robot-type arm that can sense the position and orientation of the imaging probe or the non-imaging probe. Or, an inertial guidance-type system can be used in place of the non-contacting locater described in U.S. Pat. No. Re. 30397 to sense the position and orientation of the imaging source or probe. How the invention may be used with the apparatus described in U.S. Pat. No. Re. 30397 and the variations of the apparatus noted above will be described.

When the apparatus described above utilizes an imaging probe, the purpose of the method is to provide the operator of the apparatus a means of visually guiding the positioning and orientation of the imaging probe and thus the image generated by the imaging probe with particular regard to the dimension orthogonal to the image of the imaging probe that is not visualized.

When the apparatus described above utilizes a non-imaging probe in addition to an imaging probe, the additional purpose of the method with regard to the non-imaging probe is to provide the operator a means of visually guiding the position and orientation of the probe tip and/or the desired course or direction of the probe, by imaging planes in addition to those which contain the non-imaging probe tip and/or the line of the imaging probe, for example, planes orthogonal to the line of the non-imaging probe. To achieve this the operator must interact with the apparatus and the computer software to achieve the desired goal.

Figure 3:
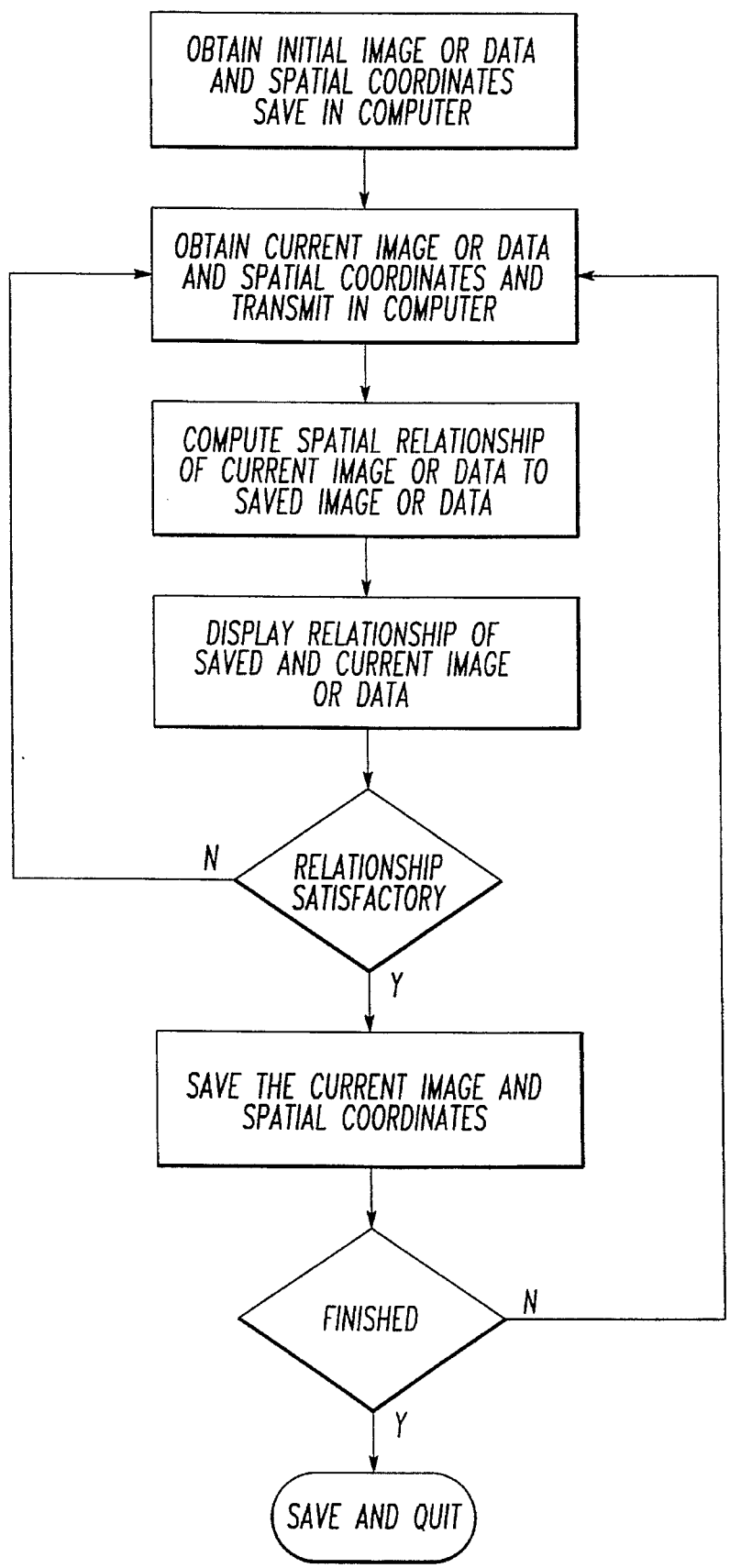
FIG. 3 is a block diagram of the general form of the method.

The general form of the method shown in FIG. 3 proceeds with the following steps:

(1) the operator, using the imaging probe, prospectively selects and acquires (saves to computer memory) an initial image (or images) and their spatial coordinates in an approximate position and orientation that visualizes the third, orthogonal non-visualized dimension of a desired image to be acquired subsequently. If a non-imaging probe is to be used, the initial image(s) should visualize the dimension approximately orthogonal to the desired path or trajectory of the probe. The initial image(s) is(are) saved in computer memory along with its(their) spatial coordinates derived from the spatial locater. The first image (or any "saved" image) is thereafter referred to as a reference image. Then, (2) the imaging probe is re-oriented (or a second probe is utilized) to acquire a desired image, which is referred to as the current image. If a non-imaging probe is used it is oriented to acquire the desired information. As the imaging probe and/or the non-imaging probe is being oriented, the spatial locater is providing spatial coordinate information regarding its(their) position and orientation in space and (3) computation of the spatial relationship of the current image (or probe tip or trajectory) to the reference image or images is carried out. The nature of this computation may be any that produces an output display that visually aids the operator positioning the current image or probe as described above. The visual output is (4) displayed on the display device of the apparatus. It may include a two or three-dimensional display of the images (or images and probe) and/or representations of them, their planes or the intersections of their planes or of the probe line and a plane. The geometric and anatomic information conveyed in the display is (5) assessed by the operator to determine if the desired position of the current image or probe with special regard to its non-visualized dimension now shown in the display has been achieved. If the current image (probe) is not satisfactorily positioned the operator returns to step (2). If the image (probe) is satisfactorily positioned it (its data) is (6) acquired and saved and the process repeated (step 2) until all necessary images are satisfactorily positioned, acquired and saved. When all necessary images have been acquired the session is complete and the process ended.

Thus, what is described is a method of visual guidance for positioning images or data in three-dimensional space which comprises obtaining initial images or data by an imaging means or non-imaging probe located in three-dimensional space by a spatial locater and transmitting to and saving in a computer said image or data and their spatial location. The imaging means (and/or the non-imaging means) then obtains additional current images or data located in three-dimensional space by the spatial locater and transmits the images or data and their spatial location to the computer. The spatial relationship of the image or data currently provided by the imaging or non-imaging probe to the saved image or data previously obtained by the image or non-imaging probe is computed and the spatial relationship of the current image or data to the previously obtained and saved image or data is displayed in an appropriately two or three-dimensional display. The displayed spatial relationship may be assessed by the operator and used to guide the positioning of the current image or data of the imaging probe (or non-imaging probe) to their desired location as shown in the display. The steps are repeated as necessary until the desired location is achieved. The current image or data and their spatial coordinates may be saved to computer memory when the position is satisfactory and the desired location is achieved. The steps of the method may be repeated as necessary until all images or data are satisfactorily positioned and saved.

If the imaging means of the apparatus is a real-time ultrasound scanner, its images are being continuously generated and are referred to as real-time images. The spatial locater is also continuously generating spatial coordinate information about the position and orientation of the imaging and/or non-imaging probe and both the images and the spatial data are continuously transmitted to the computer. The method of this invention, as preferably applied to this apparatus, uses the general outline of steps listed above to produce a "line of intersection" display in the reference image and the current image, and in a plane normal to the line of intersection. The transducer is positioned so that the real-time image is visualizing the approximate orthogonal direction of the next desired image and an image is saved in computer memory. The saved image is thereafter referred to as a reference image. The transducer is then turned (or a separate probe is utilized) so that the real-time image is in the approximate orientation desired. Immediately after the reference image is saved computation of the relationship of the real-time image to the reference image begins.

The line of intersection display consists of three views. View 1 presents a view of the reference image, Plane A, from a point that is normal to Plane A. View 2 presents a view of the current, real-time image plane, Plane B, from a point that is normal to Plane B. View 3 corresponds to the view in a plane normal to the line that describes the intersection of Planes A and B. Views 1 and 2 show the line that describes the intersection of Plane A with Plane B. View 3 describes the orientation of Plane A with respect to Plane B. The three transmitter points of the position sensor, which are attached to the transducer of the imaging or non-imaging probe, provide three points defining Planes A and B in space. These three transmitter points are transformed to the image plane of the imaging or non-imaging probes by a matrix transformation determined in a calibration process.

Figure 4:
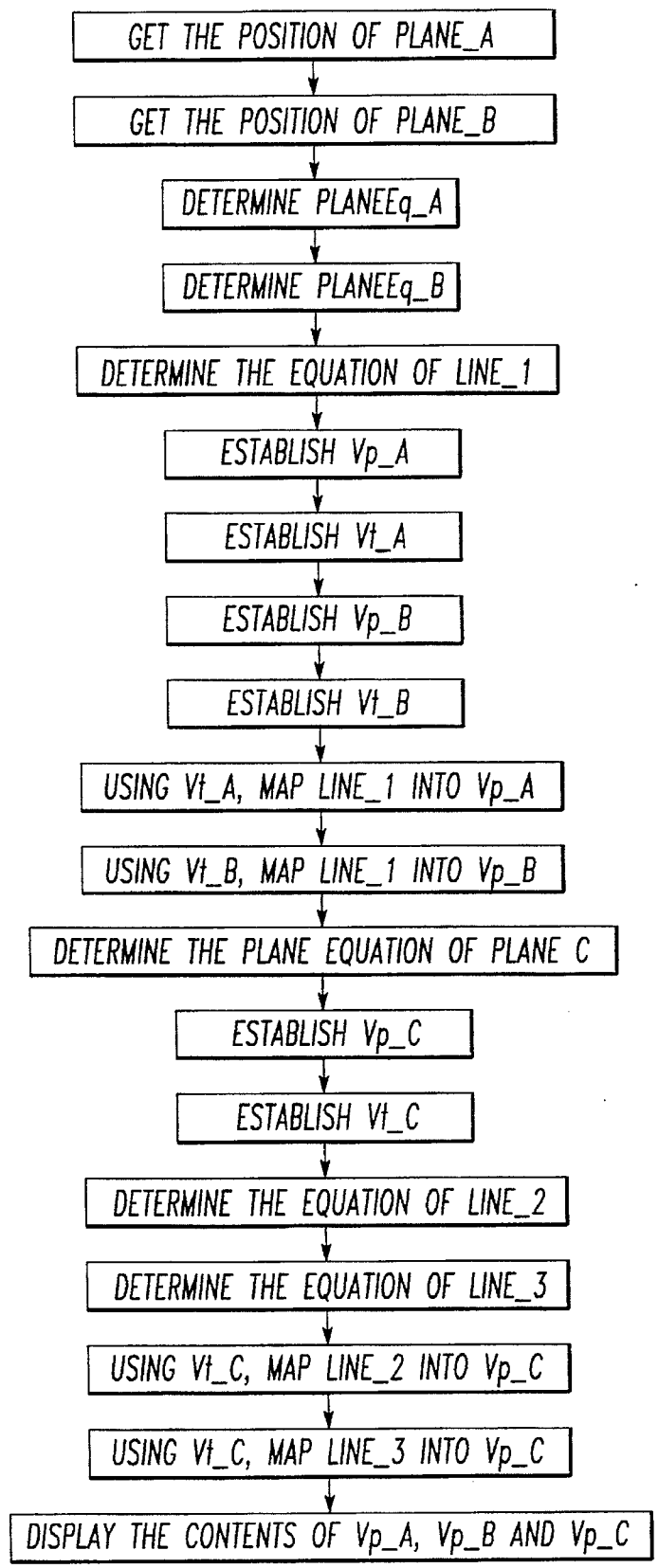
FIG. 4 is a block diagram of the steps of the computation to produce the line of intersection display.

The steps of the computation (FIG. 4) to produce the line of intersection (LOI) display proceed as follows:

1) Determine the 3-space coordinates of an arbitrary portion of planes A and B by finding the X, Y and Z cartesian coordinates of the three points in each plane.
2) From the coordinates determined in Step 1) and using the general equation for a plane in 3-dimensional space (Ax+By+Cz+D=0), determine the equation of planes A and B.
3) Using the equations of both planes, determine the equation of the line (Line 1) that describes the intersection of these two planes in 3-dimensional space. The equation of Line 1 is computed by taking the cross product of the normals of each plane (L1=N1×N2).
4) Using the position of Plane A as determined in step 1), establish the viewpoint for View 1 such that the viewpoint is normal to Plane A.
5) Using the position of Plane B as determined in step 1), establish the viewpoint for View 2 such that the viewpoint is normal to Plane B.
6) Using the equation of the line of intersection, establish the viewpoint for View 3 such that the viewpoint lies in a plane that is normal to the line of intersection.
7) For the viewpoint established in step 4), construct a viewing transformation (V.T. A) that maps View 1 into Viewport A, an area of a two-dimensional display device.
8) For the viewpoint established in step 5), construct a viewing transformation (V.T. B) that maps View 2 into Viewport B, an area of a two-dimensional display device.
9) For the viewpoint established in step 6), construct a viewing transformation (V.T. C) that maps View 3 into Viewport C, an area of a two-dimensional display device.
10) Using the equation of the Line 1 developed in step 3) and the view transformations V.T. A developed in step 7), map Line 1 into the two-dimensional display device.
11) Using the equation of the Line 1 developed in step 4) and the view transformations V.T. B developed in step 8), map Line 1 into the two-dimensional display device.
12) Determine the equation of the plane (Plane C) that contains the viewpoint for View 3 and is normal to the line of intersection determined in step 3).
13) For the plane determined in step 12), compute the equation of the line (line 2) that describes the intersection of Plane A with Plane C.
14) For the plane determined in step 12), compute the equation of the line (line 3) that describes the intersection of Plane B with Plane C.
15) Using the equation of the line (Line 2) developed in step 13) and the view transformations V.T. C developed in step 9), map Line 2 into Viewpoint C on the two-dimensional display device.
16) Using the equation of the line (Line 3) developed in step 14) and the viewing transformations V.T. C developed in step 9), map Line 3 into Viewport C on the two-dimensional display device.
17) Display the contents of Viewports A, B, and C on the two-dimensional display device.

The operator assesses the display to determine if the current image is satisfactorily positioned. If not, it is adjusted and the sequence repeated. If it is correct it is acquired and may be used as the next reference image. At that point, if the session is incomplete the process is repeated using any reference image. When all necessary images have been acquired the session is finished. The acquisition is then saved and the program ended.

Figure 5A:
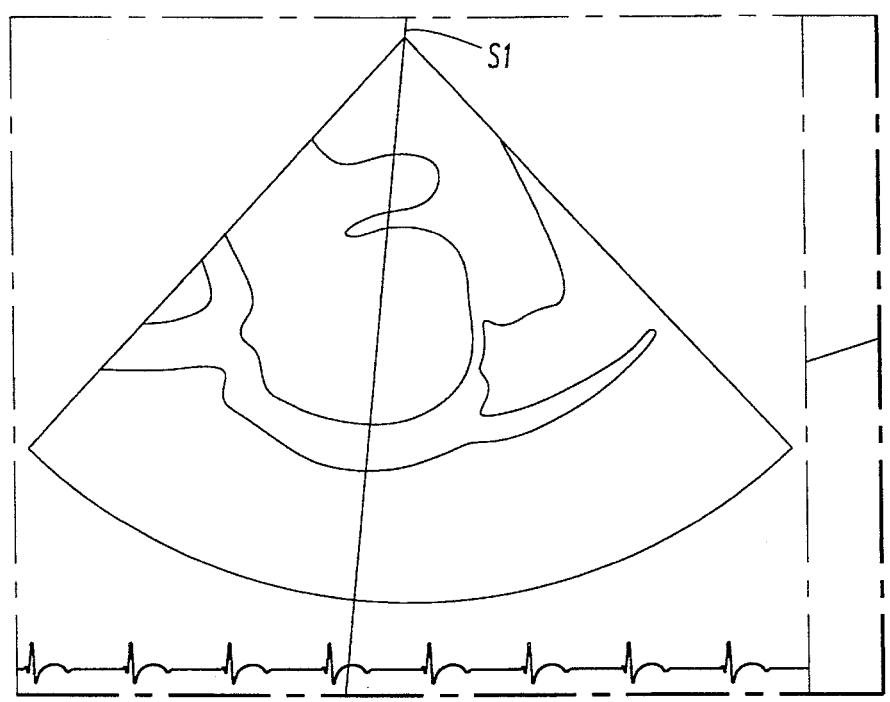
FIG. 5A is a long axis reference image of the left ventrical (R1) showing the line of intersection, S1, with the short axis image shown in FIG. 5B. The overhead display showing the angular relationship between the long axis and the short axis images is shown in the white panel on the right side of the illustration.
Figure 5B:
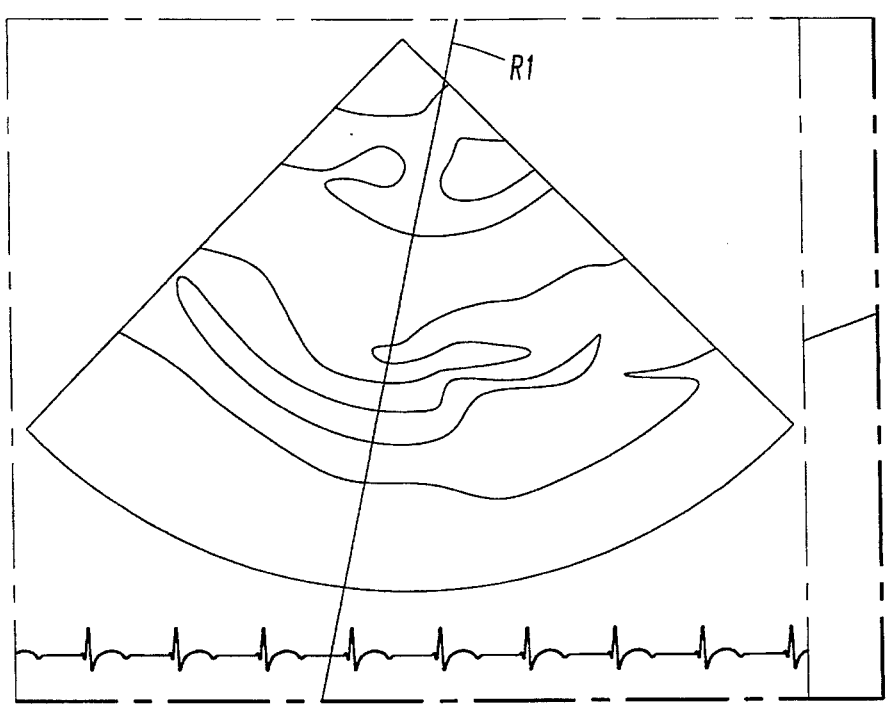
FIG. 5B is a short axis image of the same left ventricle (S1) showing its line of intersection, R1, with its reference image illustrated in FIG. 5A. The position of the line of intersection in R1 aids the positioning of S1 with respect to anatomic landmarks shown in R1.

The operation of the preferred method will now be described. First, an imaging probe such as that described in RE 30397 is used to acquire a reference image of an organ, such as the heart aligned along a major axis (for example, the long axis of the left ventricle). Next, an imaging probe is oriented so that the real-time image is positioned so that it is a short axis image approximately orthogonal to the reference image. Instantaneously, the line of intersection is displayed in each image, FIG. 5A and 5B. Also, the third viewpoint, the orthogonal "overhead" display is created. Viewing these displays, or three-dimensional variations of these displays, the operator can adjust the ultrasound transducer position and hence the real-time image position to achieve precise positioning of the real-time short axis image with respect to the reference image and to anatomic landmarks seen within both images. When the desired position is achieved, the image may be saved, becoming an additional reference image. This process may be continued as long as necessary. Each reference image may be used as needed as a guide for positioning a subsequent image.

As a variation, the first reference image may be followed by a second reference image that does not intersect the first reference image but is used in conjunction with the first reference image to position the third reference image. For example, a short axis image of the left ventricle (orthogonal to its long axis) through the aortic valve may be acquired as a first reference image. A second short axis image of the left ventricle (also orthogonal to its long axis) through the apex of the ventricle (its opposite end) may then be acquired. These two reference images may then be used to guide, by means of the line of intersection shown in each, positioning of the real-time image in the long axis of the ventricle which passes through the center of the aortic valve and the center of the apex. When this is positioned it is saved becoming the third reference image. Subsequent short axis images acquired for purposes of computing the volume of the ventricle may then be positioned by observing their line of intersection in the third, long axis reference image. The overhead display is the projection of the intersection of the two image planes into a plane normal to the line of intersection of the reference image and the current image. This view aids the operator by visualizing the amount of angular rotation between the two image planes about the axis of the line of intersection.

The center of the aortic valve and apex may be marked by a cursor in each of the first and second reference images, thus defining a line in space. Imaginary planes through the endpoints of this line and orthogonal to it may be constructed by the computer software and represented as circles on a display screen, the centers of which represent the line endpoints. The intersection of the real-time image plane with these imaginary planes may then be represented as lines of intersection through the displayed circles, as well as the real-time image, and used to guide real-time image plane positioning.

After acquisition of one or more reference images, a single line ultrasound probe or surgical probe may be activated and its position recorded by the sonic locater. The intersection of its "line" or trajectory with the reference images may be displayed and its "line" or trajectory may be projected onto the reference images to guide movement of the "line" to a desired "target." Similarly, the intersection of this line with any number of image planes between the probe and the target may be displayed to evaluate the intersection of the trajectory with intervening tissue.

Other images, such as computed tomography images, may be substituted for or added to the set of reference images and used in the same way as ultrasound images to aid positioning current images, such as ultrasound images. Such an application can be used for guidance of surgical procedures. A CT image may be obtained pre-operatively and integrated into the spatial coordinate system as described above. Then, at the beginning of an operation a surgical probe may be used as described above to localize surface anatomic landmarks for placing an incision in terms of underlying anatomy and/or pathology by associating its position with the image containing that position. The anatomy or pathology may also be observed at the same time by use of an intra-operative, real-time ultrasound scanner and the appearances of the ultrasound images and the CT images in the same spatial location correlated. A non-imaging probe, such as a biopsy needle, also localized in the spatial coordinate system, may be directed toward a lesion using the display of its spatial relationship to the CT images and the ultrasound images as guides. By viewing intervening images between the needle tip and the target that show the intersection of the needle path with the image, critical structures otherwise not visible can be seen in their relationship to the anticipated trajectory, and if vulnerable the trajectory can be modified at the time before injury occurs. A similar procedure can be used during the course of an operation to locate the extent and direction in which tissues move during the procedure, and adjust the procedure to take that information into account.

Variations of this method are possible. The first and second reference images may not be intersecting, but may be used to position a third intersecting real-time image in terms of its relationship to the first two reference images. When it is saved it become a third reference image. The third reference image may be used to acquire a fourth reference image, and so forth through the nth image, such that the line of intersection of n reference images with every other reference image and the current or real-time image is computed and displayed and used to convey meaningful information to the operator. Such a display may use one or more reference images simultaneously or sequentially and the real-time image in a two or three-dimensional display.

In the above description actual image planes or image data are used to guide subsequent acquisition. A variation of the method is possible in which imaginary points, lines, planes or volumes are constructed from the initial, reference or current real-time images using conventional geometric methods. The relationship of these constructs to the real-time or current image is then used, in a manner similar to an image plane, to guide subsequent image or probe positioning. The spatial relationship between the current image and the imaginary points, lines, planes or volumes is computed in a manner analogous to that described above using conventional geometric algorithms. An example of this variation is as follows: two anatomic points in an image, or in a reference image and a real-time image, or in two reference images may be indicated by the operator (using a cursor) to define a line in space. At the ends of the line or at any arbitrary point along the line a plane or planes may be constructed normal to it. These planes may then be represented in a two or three-dimensional computergraphic display as circles appropriately positioned along a line with the line as their center. The intersection of the current or real-time image plane (and reference planes) with the constructed planes would then be computed as in the procedure outlined above and displayed. The operator would see a line of intersection passing through each circle and could adjust the position of the current image to its desired location with respect to the circle(s). In a similar way, three points could be used to define an imaginary plane, or points, lines and/or planes could be used to define a volume such as a sphere. These planes or volumes could then be used in a similar way as described above to convey the relationship of the imaging or non-imaging probe to its non-visualized dimension and aid in achieving its desired positioning.

A capability of the apparatus described in U.S. Pat. No. Re. 30397 is that it may utilize more than one imaging or non-imaging probe either simultaneously or sequentially. In addition to locating the position of the imaging transducer probe of the real-time scanner in three-dimensional space, it may also simultaneously locate the continuous wave Doppler probe. The beam of this probe, rather than being a plane in space, is represented as a line. The method that is this invention may then also be applied for guiding the positioning of the probe by following a variation of the sequence of steps outlined above. A reference image is obtained approximately orthogonal to the desired probe line that, for example, images the desired target of the probe. The position of the probe is known from transmitters of the spatial locater attached to the probe. The position of the line of the probe is computed by a matrix transformation of the transmitters' coordinate information to the probe line determined in a prior calibration process. The equation of the line of the probe is then known and its intersection with the plane of the image may be computed by solving the equation of the line and plane for the Cartesian coordinates that satisfy both. This point may then be displayed in an appropriate two or three-dimensional computergraphic display to guide positioning of the beam of the probe. In addition, the line of the probe in three-dimensional space may be projected onto a current or reference image plane assisting in its localization and guidance.

In a manner similar to the continuous wave Doppler probe, any other probe, such as a simple straight surgical probe, may be located in space and guided to a desired position. The tip of the probe may be located in the calibration process as a specified point on the line of the probe. The line of a probe may be projected "forward" in space from the tip of the probe, as in the case of the Doppler ultrasound beam, to show its path and the intersection of this path with various images if moved along its projected line. Each image intersecting the path between the tip and the target could be selectively, sequentially or collectively viewed. Computation of the intersection of the projected path with an image would be carried out in the same manner as described above. Such a technique would be useful for evaluation of the structures in the path of a biopsy needle and for the accurate three-dimensional placement of the biopsy needle tip.

With the tip of the needle, or the tip of the probe, specified as a point along its line, a variation of the use of the probe is possible in which it is used to discover which of a series of reference images or the current real-time image is closest to, or contains, the location of the tip of the probe. This may be achieved by computing the distance between the tip of the probe and all possible planes along a line normal to each plane, with the shortest distance selecting the closest plane. By visually displaying in an appropriate two or three-dimensional format the probe tip position with respect to the various planes the operator could learn the location of the probe tip with respect to not otherwise visualized anatomy and guide the probe to its desired position. The desired position may define the margins of a surgical incision. By moving the probe over a patient's skin and observing the underlying internal anatomy in images that correspond to that point the method could be used to guide the placement of an operative incision or an operative field. That is, the method could be used for pre-operative and/or intra-operative surgical planning and guidance. This method might be used repeatedly during the course of the surgery to prospectively plan the placement of each subsequent step in terms of the underlying anatomy as it was being altered by the surgical procedure itself. It should be understood that the probe might be better represented as a plane or volume than as a point or line, however the underlying applications would remain essentially the same, although the computations would be adjusted for the changed geometry.

An alternate imaging means, such as an X-ray computed tomography scanner, magnetic resonance scanner or angiogram may be used in conjunction with the apparatus described in U.S. Pat. No. Re. 30397, or a variation of it, simultaneously or sequentially with the ultrasound scanner. By so doing, its images may become reference images in the three-dimensional spatial coordinate system defined by the position locater and used with the method of this invention in all of the ways described above. Incorporating a CT scanner, for example, into the apparatus as an imaging probe is achieved by defining an appropriate transformation matrix between the image plane of the CT canner and the apparatus described in U.S. Pat. No. Re. 30397. The transformation between the physical plane of the X-ray beam and a plane defined by three co-planar laser pointers mounted in a fixed relationship to the X-ray beam would be created by a calibration process. Three points created by the three co-planar laser pointers on the patient would be marked on the patient in a semi-permanent manner as fiducial markers. The spatial relationship of these fiducial marks would then be transmitted to the three-dimensional apparatus by touching them with the tip of a probe suitably located in space (as described above) by the spatial locater. Thus, the computer now has stored in memory the spatial coordinates of the three fiducial marks and uses the transformation matrix between them and the X-ray beam to compute the true position of the CT image in the patient with respect to the three-dimensional locating device. The method of this invention may then be applied to the CT images using them as reference images for other imaging devices or probes also located in the space defined by the spatial locater. In a comparable way MRI, conventional X-ray or angiographic images could be incorporated into the three-dimensional apparatus. An alternate means of incorporating the CT or other images into the three-dimensional space of the apparatus is to image each of three fiducial points on the patient in the images of the examination, with no more than two points in any one image plane. Then the fiducial points are marked on the patient as described above and also marked within the images. The exact spatial relationship between all of the images containing the fiducial points, and related images, must be known. For example, the CT images must be parallel and the spacing between each must be known. Then the relative position of the images within the patient can be computed from a transformation between the plane of the marker coordinates in the images and on the patient to the plane (s) of the image (s).

The display that is utilized to visually convey to the operator the spatial relationship of the various images or probe position may be a two-dimensional display or a so-called three-dimensional computergraphic display. Whereas the various imaging probe modalities that may be used at the present time produce planar two-dimensional images, the pixels that form these images are located in a three-dimensional spatial coordinate system and therefore may be transformed to voxels, that is, arbitrarily given a volume. For example, a one by one millimeter pixel may be transformed to a one by one by one millimeter voxel whose center is closest to the center of the pixel. As a consequence the image data may be manipulated either as planar data or as volume data. This provides greater flexibility in displaying the reference image data to fulfill the purpose of this method. A volume image, so-called voxel rendering, may be used to show the non-visualized dimension. This volume image, or its component planar images, may be re-sliced to provide a new reference image plane which is more suitable for conveying the desired information than any of the existing planar images. By using other computergraphic techniques, such as perspective, wire-frame models, surface rendering, shading, shadowing, animation or rotation and stereoscopy the data may be more appropriately displayed than in the format in which it was originally acquired. Common to whatever display method is used however is the process of computing the spatial relationship of the current image or probe to the prior reference data.

While present preferred embodiments of the invention have been shown, it is distinctly understood that the invention is not limited thereto but may be otherwise variously embodied within the scope of the following claims.

I claim:

1. A method for instantaneously displaying interactively a three dimensional spatial relationship between at least one real-time ultrasound image of tissue and at least one reference image of that tissue, comprising the steps of:

(a) producing at least one reference image by obtaining reference image data through a probe means, obtaining positional data corresponding to the reference image data by a spatial locater means, and transmitting the reference image data and the reference positional data to a processing and storage means;

(b) producing a plurality of real-time images that are at selected orientations relative to the reference image by obtaining real-time image data through an ultrasound probe, obtaining positional data corresponding to the real-time image data through a spatial locater means, and transmitting the real-time image data and the corresponding positional data to the processing and storage means;

(c) generating independent data representing spatial relationships between the real-time image data and the reference image data by processing the reference image positional data and the real-time image positional data in the processing and storage means; and (d) displaying the real-time images and the at least one reference image, wherein each real-time image is displayed instantaneously with the obtaining of its real-time image data, and wherein the displayed images further instantaneously display the three-dimensional spatial relationship between the reference image and the real-time images using the generated independent data.

2. The method of claim 1 further comprising the step (e) storing at least one of the real-time images in the processing and storage means as a next reference image.

3. The method of claim 2 further comprising the step (f) displaying the next reference image and the real-time images, wherein the displayed images further display the three-dimensional spatial relationship between the next reference image and the real time images.

4. The method of claim 1 wherein the data representing the spatial relationship between the reference image and the real-time images are generated and displayed as a line of intersection of the reference image and the real-time images.

5. The method of claim 4 wherein the data representing the spatial relationship between the reference image and the real-time images are generated and displayed in a projection orthogonal to the line of intersection of the reference image and the real-time images.

6. The method of claim 1 wherein the probe means for obtaining the reference image data comprises at least one of an ultrasound probe, an X-ray computed tomography scanner, a nuclear magnetic resonance scanner and a radiograph.

7. The method of claim 1 wherein the spatial locater means comprises at least one of an acoustic position sensor, an optical position sensor, a magnetic position sensor, an electro-mechanical position sensing arm, and an inertial position sensor.

8. The method of claim 1 further comprising at least one non-imaging probe, wherein positional data corresponding to the position of the non-imaging probe is obtained by a spatial locater means, the non-imaging probe positional data being transmitted to a processing and storage means; and wherein independent data is generated representing spatial relationships between at least two of the reference image data, the real-time image data and the non-imaging probe by processing the reference image positional data, the real-time image positional data and the non-imaging probe positional data in the processing and storage means; and wherein at least one of the real-time images and the at least one reference images are displayed, wherein the spatial relationship between at least two of the non-imaging probe, the real-time images and the at least one reference image is further displayed.

9. The method of claim 1 wherein the reference image is provided on a first display and the real-time images are displayed on a second display.

10. The method of claim 9 wherein the spatial relationship between the reference image and the real-time images is generated and displayed as a line of intersection of the reference image and the real-time images and is also generated and displayed in a projection orthogonal to the line of intersection of the reference image and the real-time images.

* * * * *